2960½X
J. S. Trott.
Screw Propeller.
Patented Jun. 2, 1818.
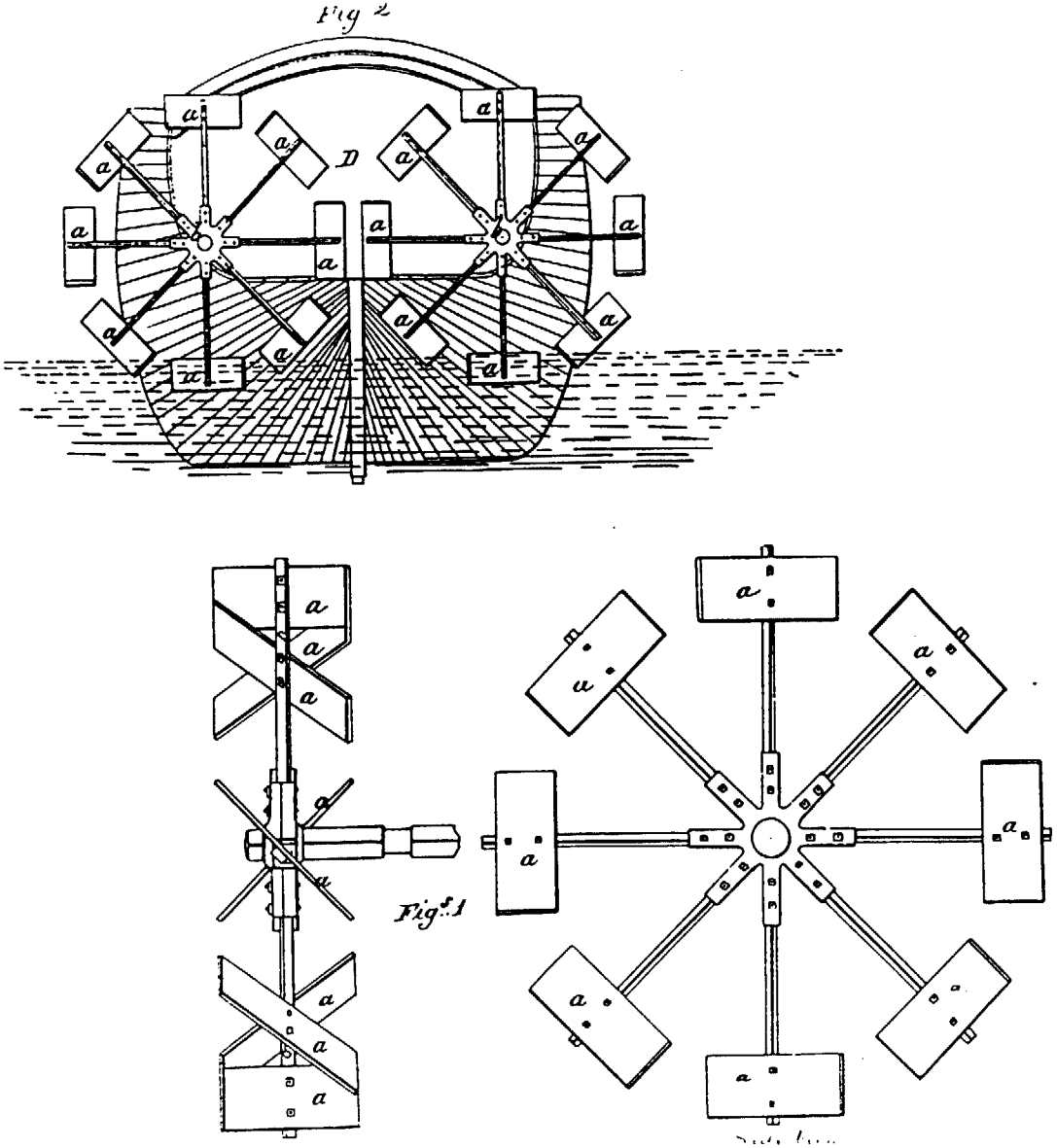

TEMPORARY NOTICE of BEST AVAILABLE IMAGE

U. S. PATENT AND TRADEMARK OFFICE

---

THE SCANNED IMAGES OF PATENT NUMBER 2960 1/2 X FOR THE ISSUE DATE OF

6 / 2 / 1818 ARE NOT THE COMPLETE ORIGINAL

DOCUMENT, BUT CONTAIN A COPY OF THE BEST

AVAILABLE TEXT AND IMAGE DATA FROM VARIOUS

SOURCES.

WHEN THE MISSING INFORMATION BECOMES AVAILABLE,

THE DOCUMENT WILL BE RESCANNED AND REPLACED.

ANY QUESTIONS SHOULD BE DIRECTED TO THE DATA

MAINTENANCE BRANCH BY TELEPHONE AT (703) 306-3116.

---

TEMPORARY NOTICE of BEST AVAILABLE IMAGE